United States Patent [19]
Brunnmueller et al.

[11] 3,816,376

[45] June 11, 1974

[54] CONTINUOUS MANUFACTURE OF AMINO RESIN SOLUTIONS

[75] Inventors: Friedrich Brunnmueller, Ludwigshafen; Hermann Schatz, Neustadt; Johann Mayer, Ludwigshafen; Otto Grabowsky, Limburgerhof, all of Germany

[73] Assignee: Badische Anilin- & Sofa-Fabrik Aktiengesellschaft, Ludwigshafen/Rhein, Germany

[22] Filed: June 19, 1972

[21] Appl. No.: 264,233

Related U.S. Application Data

[63] Continuation-in-part of Ser. No. 229,502, Feb. 25, 1972, abandoned.

[30] Foreign Application Priority Data

Feb. 25, 1972 Germany............................ 2109754

[52] U.S. Cl. ...... 260/69 R, 260/29.4 R, 260/67.6 R

[51] Int. Cl............................................. C08g 9/10
[58] Field of Search ........... 260/67.6 R, 69 R, 72 R

[56] References Cited
FOREIGN PATENTS OR APPLICATIONS
1,570,998  3/1970  Germany
OTHER PUBLICATIONS
Chem-Abstracts, Vol. 71, 1969, 22558F. Meissner

*Primary Examiner*—Howard E. Schain

[57] ABSTRACT

Continuous process for the manufacture of amino resin solutions, especially solutions of urea/formaldehyde resins, by contacting the reactants in a cascade of at least three stirred vessels with back-mixing of the solution whilst maintaining specific molar ratios of amino resin forming material to formaldehyde and specific pH ranges in the individual stirred vessels.

6 Claims, No Drawings

CONTINUOUS MANUFACTURE OF AMINO RESIN SOLUTIONS

This invention is a continuation-in-part of Ser. No. 229,502 filed Feb. 25, 1972 and now abandoned.

This invention relates to a continuous process for the manufacture of amino resin solutions produced from formaldehyde and amino resin forming materials, especially urea, in at least three cascade-connected stirred vessels at elevated temperature and with a number of changes of the relative molar proportions of the reactants.

In conventional batchwise operations for the manufacture of solutions of amino resins the reaction is carried out in separate reaction vessels or stirred vessels, in which the reactants formaldehyde and, say, urea are condensed in aqueous solution initially under alkaline conditions and then, after acidification, under acid conditions, to form a resin solution. Usually, condensation is followed by an increase in pH to neutral or slightly alkaline values by the addition of alkaline solution.

In conventional continuous manufacturing processes use is usually made of tubular reactors in which condensation proceeds without back-mixing, i. e., in a medium showing substantially laminar flow. Indeed, the literature states that a commercially useful product can only be obtained when no back-mixing occurs during the appropriate reaction time. It is stated that the pH of the reaction mixture should, during this supposedly decisive condensation phase, experience a gradual, i. e., substantially linear, drop from a relatively high value to a value several units lower. At the same time, a number of discrete temperature stages may be maintained by appropriately heating successive sections of the reaction tube system.

In another continuous process the reactants are initially heated separately and then combined in an injection chamber together with acid or basic catalyst; the partial condensation initially taking place in this mixing chamber is then completed in a further vessel.

The continuous processes in the prior art have a variety of drawbacks. When tubular reactors are used and no back-mixing takes place there is a ready tendency to incrustation or blockage of the reactors frequently making it necessary to carry out time-consuming and expensive mechanical cleaning operations. Another disadvantage is the difficulty of adapting the plant to various throughput rates. In these systems, a power failure or the sudden absence of one of the reactants is particularly serious, as this leads to the blockage of a large amount of reactive liquids, as a result of which the entire plant might come to a standstill.

It is an object of the invention to provide a process in which solutions of amino resins may be manufactured in a simple manner without the occurrence of the above drawbacks.

In accordance with the invention, this object is achieved in a continuous process for the manufacture of amino resin solutions by condensing amino resin forming materials with formaldehyde in the presence of a catalyst mixture of amine and acid in homogeneous aqueous solution at or near the boil in stirred vessels, wherein the reaction is carried out in a cascade of at least three stirred vessels with back-mixing of the solution in said vessel and the added quantities of catalyst mixture and the amount of amino resin forming materials, of which the major portion is mixed with the formaldehyde solution and then passed to the first stirred vessel and the remainder of the required amount is metered in at least one further portion to one of the following stirred vessels, are selected so that the molar ratio of formaldehyde to amino resin forming material in the first stirred vessel is from 2.1 to 3 and the pH in said vessel is from 5.5 to 7.5, that the molar ratio of formaldehyde to amino resin forming material in the subsequent stirred vessel or vessels is in the range of 1.6 to 2.6, preferably 1.8 to 2.1, and the pH is in the range of 4 to 6, the pH being lower in each subsequent stirred vessel than in the previous one, and that the molar ratio of formaldehyde to amino resin forming material in the last vessel is from 1.4 to 2.2 and the pH in said last vessel is from 5.5 to 7.5.

As is well known to the expert in the field of amino resins these resins are not storable if the pH is lower than 6. Therefore the solutions obtained according to the invention are finally neutralized, i. e., the pH is adjusted to approximately 8, either in a separate vessel after the solution has passed the last vessel or in the last vessel itself.

The preferred amino resin forming material is urea, although dicyanodiamide or melamine or mixtures of these substances with urea may also be used.

The urea is usually employed in the form of a 50 to 90 percent aqueous solution. It is advantageous to use an aqueous solution just as it is formed in the synthesis of urea. However, it is possible to use a solution of urea or any other amino resin forming substance in aqueous formaldehyde solution having a neutral or slightly acid pH.

The formaldehyde is used in the form of commercially available 30 to 45 percent solutions. Alternatively, the starting material may be an aqueous solution of a precondensate of formaldehyde and, say, urea, which contains an excess of formaldehyde and may be obtained by absorption of formaldehyde gas in aqueous urea solution, or it may be a precondensate of urea and formaldehyde.

The basic component of the catalyst solution is ammonia or amines or both, ammonia being preferred. Suitable amines are low molecular weight primary, secondary and tertiary alkylamines and hydroxyalkylamines, specific examples being methylamine, ethylamine, mono-, di- and tri-ethanolamines and ethylene diamine.

The acids used are inorganic or organic acids having a pK value of less than 4.0 such as hydrochloric, sulfuric, nitric, phosphoric, acetic, chloroacetic, oxalic, maleic and, in particular, formic acid, and the acid salts thereof.

The base/acid mixture is preferably used in the form of an aqueous solution in which there is a considerable excess of amine which, depending on the molar ratio of the main reactants and the average residence time in the cascade of vessels, corresponds to a ratio of gram-equivalents of amine to gram-equivalents of acid of between 10:1 and 150:1 and preferably between 15:1 and 100:1.

The reaction is carried out at or near the boiling temperature of the solution, i.e., at from about 90° to 105°C.

The stirred vessels used in the cascade are of conventional design. It is convenient to use stirred vessels of equal size, but individual vessels, particularly the second stirred vessel, may be larger if it is desired to increase the residence time. In such a case, it is advantageous, commercially, to replace the second stirred vessel by two stirred vessels so that the cascade preferably comprises four or, in a particularly preferred embodiment, five stirred vessels of equal size.

The stirred vessels are conveniently in cascade so that the solution overflowing from the first vessel is gravity fed to the second vessel and so on. It has been found to be particularly advantageous to feed the material overflowing from one vessel to the next through a pipe which dips well down into the said next vessel to afford complete and uniform back-mixing of the vessel contents.

Specifically, the reaction of the invention is effected by mixing aqueous solutions of the reactants formaldehyde and, say, urea in a mixing zone with a catalyst solution and then immediately passing the mixture to the first reactor of the cascade of stirred vessels. If the individual solutions are preheated to about 50 to 60°C, the temperature in the first reactor automatically rises to about 95°C and the slightly exothermic reaction causes the temperature in the following stirred vessels to remain at the boiling point without the need for external heating.

The amino resin forming substance is metered to the various stirred vessels in at least two and preferably in three or four portions. In the case of four stirred vessels, the following molar ratios of formaldehyde to amino resin forming substance, especially urea, should be maintained:

1st stirred vessel: FA : urea = 2.1 to 3, preferably 2.1 to 2.5 molar;

2nd stirred vessel: FA : urea = 1.8 to 2.6, preferably 1.9 to 2.4 molar;

3rd stirred vessel: FA : urea = 1.6 to 2.4, preferably 1.7 to 2.2 molar;

4th stirred vessel: FA : urea = 1.4 to 2.2, preferably 1.5 to 2.1 molar.

Where precondensate solutions of formaldehyde and urea are used, it is preferred to operate at the higher values within the range of molar ratios specified, whereas the lower values are preferred when formaldehyde solutions are used.

It is important, in our process, that the specified pH gradings be maintained in the individual reactors so that the contents of a stirred vessel are at a distinctly lower pH than the contents of the previous vessel. Thus the reaction solution overflowing from one stirred vessel to the next is, due to rapid stirring, virtually immediately added to a reaction medium of lower pH. As the rate of the condensation reaction rises with the concentration of hydrogen ions, there will be sudden increases in the uniform rate of cross-linking.

The pH necessary for the condensation reaction may be set in a single operation by adding a suitable catalyst solution together with the main components formaldehyde or formaldehyde-containing precondensate and amino resin forming substance to a mixing zone located immediately upstream of the first stirred vessel. Alternatively, the specified pH ranges may be obtained by adding pH-controlling components to the individual stirred vessels. The actual pH's used are governed by the number and size of the stirred vessels used, i. e., by the average residence time in each vessel and by the quantity and composition of the catalyst used. It is therefore possible, by selecting suitable components, to achieve the required pH ranges by the single addition of catalyst to the mixing zone upstream of the first stirred vessel.

The rate of addition is effected so that the initial pH, i. e., the pH in the mixing zone, at a low temperature, is in the alkaline range and that the reaction taking place in the first stirred vessel does so under neutral or slightly acidic conditions, whilst the pH becomes progressively more acidic from vessel to vessel. For example, the following pH gradings might be chosen for a cascade of five stirred vessels of equal size:

| | |
|---|---|
| Initial pH of mixture: | 7.3 to 8.3 |
| pH in vessel 1: | 6.0 to 7.0 |
| pH in vessel 2: | 5.0 to 6.0 |
| pH in vessel 3: | 4.5 to 5.0 |
| pH in vessel 4: | 4.0 to 4.5 |
| pH in vessel 5: | 6.5 to 7.5 |

In our process, the residence time under alkaline conditions in the mixing zone is usually from 5 to 25 seconds, whilst the residence time in each of the following pH stages is from about 5 to 15 minutes per stage.

It is possible to prepare from 30 to 60 percent resin solutions by the process of the invention. The resin solutions thus prepared are distinguished by particularly good stability. The novel process is far less trouble-prone than prior art processes, since if there is a power failure or one of the starting materials fails to appear, each of the stirred vessels can be immediately neutralized and cooled. Due to back-mixing, on-streams times of up to 3,000 hours have been possible before it has been necessary to stop the process for the removal of incrustation. The plant may then be cleaned within a few hours. Furthermore, the throughput may be varied from full capacity to only a third of the capacity of the plant without the product deviating from the standard. It is worthy of note that the above-described manufacture of resin solutions in a cascade of stirred vessels is possible with a minimum of personnel. Two production lines may be controlled and serviced by one man.

The resulting solutions may be concentrated in known manner at reduced pressure to form concentrated resin solutions (solids content from about 60 to 75 percent) or dried to a resin powder by spray drying.

EXAMPLE 1

1,400 parts/hr of a 35% aqueous formaldehyde solution are mixed continuously with 532 parts/hr of an 80% urea solution and 49.4 parts/hr of an aqueous solution containing 10 parts/hr of ammonia and 0.25 parts/hr of formic acid in a mixing zone, where the mixture remains for about 20 seconds before being passed to the first of four cascade-connected reactors. After an average residence time of about 12 minutes in one reactor the solution passes to the next reactor, the average residence time being the same in each case. In this and the following Examples the parts are by weight.

To each of the second and third reactors there are added 50 parts/hr of the urea solution and 184 parts/hr of said solution are added to the fourth reactor.

The pH's obtained using the above catalyst mixture are as follows (as measured with glass electrodes at 20°C):

mixing zone pH 8.0

1st reactor pH 6.6

2nd reactor pH 5.4

3rd reactor pH 4.5.

In the fourth reactor the pH is adjusted to 7.1 by adding dilute caustic soda solution.

The temperature in the first reactor is 94°C and in the second, third and fourth reactors it is 101°C, 102°C and 100°C respectively.

The resulting resin solution is continuously concentrated by evaporation under reduced pressure to a concentration of 65 percent by weight of resin.

EXAMPLE 2

3,835 parts/hr of an aqueous precondensate solution containing 1,535 parts/hr of formaldehyde and 877 parts/hr of urea, 550 parts/hr of a 90 percent urea solution and 49 parts/hr of an aqueous solution containing 9.8 parts/hr of ammonia and 1.4 parts/hr of formic acid are continuously metered to a mixing zone from which the mixture is immediately (residence time about 7 seconds) fed to the first of five reactors arranged in a cascade. The average residence time of the solution in each of the reactors is about 7 minutes.

Urea solution is added to the second, third and fourth reactors at rates of 116, 84.6 and 503 parts/hr respectively.

The pH's obtained on account of the catalyst mixture used are as follows (as measured with glass electrodes at 20°C):

mixing zone pH 7.9

1st reactor pH 6.5

2nd reactor pH 4.8

3rd reactor pH 4.3

4th reactor pH 4.2.

The pH in the fifth reactor is adjusted to from 7.0 to 7.3 by adding dilute caustic soda solution.

The temperatures in the first, second, third, fourth and fifth reactors are 97°C, 100°C, 101°C, 100°C and 100°C respectively.

The resulting resin solution contains more than 50 percent of solids. The solution is evaporated under vacuum to a solids content of about 60 to 70 percent to give a resin solution having very good properties.

EXAMPLE 3

1,106 parts/hr of an aqueous precondensate solution containing 442 parts/hr of formaldehyde and 221 parts/hr of urea and having a temperature of 70°C, 1,060 parts/hr of 35 percent formaldehyde solution, 1,058 parts/hr of a 65 percent urea solution having a temperature of 75°C and 35 parts/hr of an aqueous solution containing 15.9 parts/hr of methylamine and 0.5 part/hr of sulfuric acid are continuously fed to a mixing zone and, after mixing, immediately passed to the first of five reactors arranged in a cascade. The average residence time of the mixture is calculated to be about 10 minutes in each of the reactors which are all of the same size.

The nature and quantity of the catalyst mixture used provides the following pH's as measured with glass electrodes at 20°C:

mixing zone pH 7.6

1st reactor pH 6.7

2nd reactor pH 5.4

3rd reactor pH 4.6

4th reactor pH 4.4.

The pH in the fifth reactor is adjusted to about 7.2 by adding dilute caustic soda solution.

The temperatures in the first, second, third, fourth and fifth reactors are 95°C, 101°C, 103°C, 100°C and 100°C respectively.

The resulting condensate solution shows phase separation when mixed with 5 volumes of water at 26°C. When evaporated under vacuum to a solids content of about 65 percent, the solution provides an adhesive resin of excellent all-round properties and very good stability.

We claim:

1. A continuous process for the manufacture of amino resin solutions by condensing amino resin forming materials with formaldehyde in the presence of a catalyst mixture of amine and acid in homogeneous aqueous solution at or near the boil in stirred vessels, wherein the reaction is carried out in a series of at least three stirred vessels with back-mixing of the solution in said stirred vessels and the added quantities of catalyst mixture and the amount of amino resin forming materials, of which the major portion is mixed with the formaldehyde solution and then passed to the first stirred vessel and the remainder of the required amount is metered in at least one further portion to one of the following stirred vessels are selected such that the molar ratio of formaldehyde to amino resin forming material in the first stirred vessel is from 2.1 to 3 and the pH in said vessel is from 5.5 to 7.5, that the molar ratio of formaldehyde to amino resin forming material in the subsequent stirred vessel or vessels is in the range of 1.6 to 2.6 and the pH is in the range of 4 to 6, the pH in each subsequent stirred vessel being lower than in the previous one, and that the molar ratio of formaldehyde to amino resin forming material in the last vessel is from 1.4 to 2.2 and the pH in said last vessel is from 5.5 to 7.5.

2. A process as claimed in claim 1 wherein the molar ratio of formaldehyde to amino resin forming material in the subsequent stirred vessel or vessels is in the range of from 1.8 to 2.1.

3. A process as claimed in claim 1, wherein the reaction is carried out in four or five cascade-connected stirred vessels.

4. A process as claimed in claim 1, wherein the amino resin forming material is urea.

5. A process as claimed in claim 1, wherein the catalyst mixture is a solution containing ammonia or amines and acids or acid salts thereof having a pK value of less than 4.0, the molar retio of ammonia or amine to acid being from 10 to 150.

6. A process as claimed in claim 1, wherein, in place of pure formaldehyde solution, a solution of a precondensate of formaldehyde and urea having a molar ratio of formaldehyde to urea of at least 1:3.5 is reacted with urea.

* * * * *

UNITED STATES PATENT AND TRADEMARK OFFICE
CERTIFICATE OF CORRECTION

PATENT NO. : 3,816,376
DATED : June 11, 1974
INVENTOR(S) : FRIEDRICH BRUNNMUELLER, H. SCHATZ, J. MAYER, O. GRABOWSKY It is certified that error appears in the above-identified patent and that said Letters Patent are hereby corrected as shown below:

Column 6, penultimate line, cancel "1:3.5" and substitute --3.5:1--.

Signed and Sealed this twenty-seventh Day of January 1976

[SEAL]

Attest:

RUTH C. MASON
*Attesting Officer*

C. MARSHALL DANN
*Commissioner of Patents and Trademarks*